United States Patent
Ramalingam et al.

(10) Patent No.: US 9,042,535 B2
(45) Date of Patent: May 26, 2015

(54) ECHO CONTROL OPTIMIZATION

(75) Inventors: Thiyagesan Ramalingam, Milpitas, CA (US); Bhargav G. Pandya, Fremont, CA (US); Gary A. Skrabutenas, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 12/893,724

(22) Filed: Sep. 29, 2010

(65) Prior Publication Data

US 2012/0076287 A1    Mar. 29, 2012

(51) Int. Cl.
*H04M 3/42*    (2006.01)
*H04M 9/08*    (2006.01)
*H04L 12/66*   (2006.01)
*H04B 3/23*    (2006.01)

(52) U.S. Cl.
CPC ........................................ *H04B 3/23* (2013.01)

(58) Field of Classification Search
USPC .................. 379/202.01, 158, 406.01–406.03, 379/406.08
See application file for complete search history.

(56) References Cited

U.S. PATENT DOCUMENTS

| | | | |
|---|---|---|---|
| 4,005,277 A | | 1/1977 | Araseki |
| 4,577,071 A | | 3/1986 | Johnston et al. |
| 4,645,883 A | * | 2/1987 | Horna et al. ............. 379/406.08 |
| 4,648,108 A | * | 3/1987 | Ellis et al. ................ 379/202.01 |
| 5,274,705 A | * | 12/1993 | Younce et al. ........... 379/406.05 |
| 5,305,307 A | * | 4/1994 | Chu .............................. 370/288 |
| 5,386,465 A | * | 1/1995 | Addeo et al. ............. 379/202.01 |
| 5,563,944 A | * | 10/1996 | Hasegawa ................. 379/406.04 |
| 5,978,763 A | * | 11/1999 | Bridges ......................... 704/233 |
| 6,226,380 B1 | * | 5/2001 | Ding ......................... 379/413.01 |
| 6,282,286 B1 | * | 8/2001 | Reesor et al. ............ 379/406.05 |
| 6,424,635 B1 | * | 7/2002 | Song ............................. 370/286 |
| 6,442,272 B1 | * | 8/2002 | Osovets ................... 379/406.01 |
| 6,507,653 B1 | * | 1/2003 | Romesburg .............. 379/406.05 |
| 6,574,336 B1 | * | 6/2003 | Kirla ......................... 379/406.01 |
| 6,694,019 B1 | | 2/2004 | Song |
| 6,816,592 B1 | * | 11/2004 | Kirla ......................... 379/406.05 |
| 6,850,783 B1 | * | 2/2005 | Romesburg ................... 455/570 |
| 6,961,421 B2 | * | 11/2005 | Zhang et al. ............. 379/406.01 |
| 7,010,119 B2 | | 3/2006 | Marton et al. |
| 7,110,532 B2 | * | 9/2006 | Kramer ..................... 379/406.06 |

(Continued)

FOREIGN PATENT DOCUMENTS

EP    2 202 892 A1    6/2010
WO   WO 2012/044462 A1    4/2012

OTHER PUBLICATIONS

International Search Report and Written Opinion dated Nov. 28, 2011 in PCT Application No. PCT/US2011/051692.

*Primary Examiner* — William Deane, Jr.

(57) ABSTRACT

In one implementation, a conference hosted on a conference bridge that includes an echo control device that classifies the echo return loss of a plurality of endpoints. The endpoints may include endpoints on internet protocol (IP) networks and public switched telephone networks (PSTN). The echo control of the endpoints is controlled independently. An echo classification module calculates the echo return loss value of the associated echo tail of the endpoint and chooses an appropriate echo control mode. If the echo return loss is above a high threshold, a pass through mode is activated. If the echo return loss is below a low threshold, a full echo cancellation mode is activated. If the echo return loss is between the low threshold and the high threshold, an echo suppression mode is activated.

20 Claims, 6 Drawing Sheets

(56) References Cited

U.S. PATENT DOCUMENTS

| | | | |
|---|---|---|---|
| 7,817,797 B2 * | 10/2010 | Popovic et al. | 379/406.08 |
| 8,081,735 B1 * | 12/2011 | Hsieh | 379/22.03 |
| 8,204,253 B1 * | 6/2012 | Solbach | 381/94.7 |
| 8,767,974 B1 * | 7/2014 | Lu et al. | 381/73.1 |
| 2003/0123399 A1 | 7/2003 | Zhang et al. | |
| 2003/0231761 A1 | 12/2003 | Zhang | |
| 2005/0004796 A1 * | 1/2005 | Trump et al. | 704/225 |

* cited by examiner

ECHO CONTROL OPTIMIZATION

FIELD

The present embodiments relate to control of echo cancellation.

BACKGROUND

A conference bridge receives audio streams from multiple endpoints and mixes them into a single outgoing feed. The conference bridge sends the single feed to multiple endpoints. A conference hosted on a conference bridge may be used as a communications tool for conducting virtual meetings with geographically dispersed participants. These conferences are most effective when the speech or other audio in the conference is of sufficient quality such that all participants can be heard and understood with little effort. However, many factors may contribute to a reduction in the quality of the voice and consequently increase the effort required to understand the conversation.

Further, quality reductions may be magnified due to the shared nature of conferences. That is, one participant suffering from poor signal quality can affect the experience of the entire conference. A common cause of poor signal quality is line echo. Conventional systems for reducing line echo involve high levels of hardware and/or processing resources. The drain on resources may be such that a conference bridge is capable of handling significantly fewer nodes when any one or more nodes suffers from line echo.

DETAILED DESCRIPTION

Overview

Figure 1:
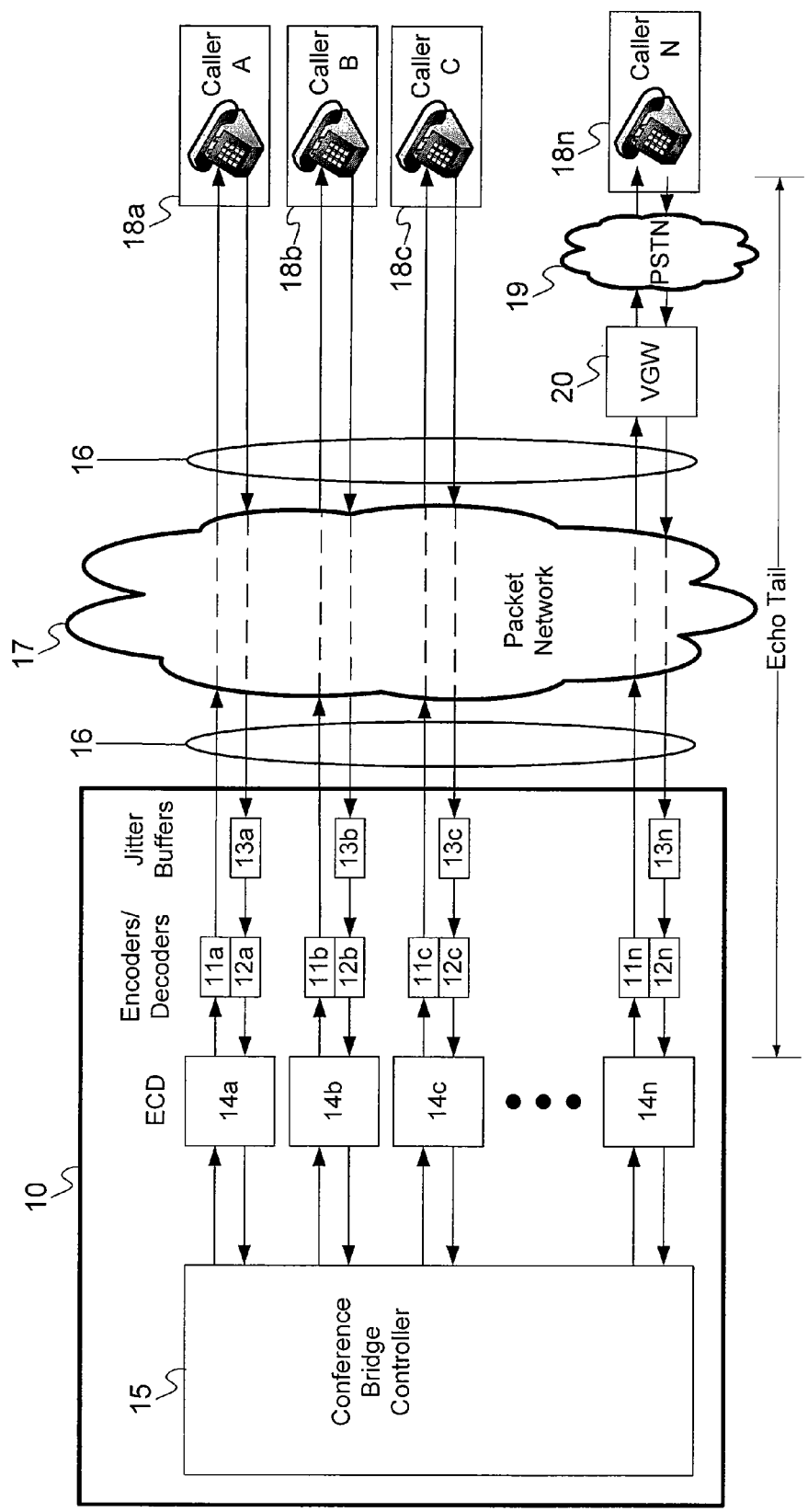
FIG. 1 illustrates an embodiment of an audio conference.

A conference hosted on a conference bridge may include endpoints on internet protocol (IP) networks and/or public switched telephone networks (PSTN). When echo occurs on any of the communication paths or at any of the endpoints, the entire conference is affected. The echo may be caused by a variety of sources. One cause of echo, which may be prevalent in a conference including both IP based and PSTN based endpoints, is caused when a discontinuity exists in the communication path. The discontinuity may be created by the mismatch between four wire and two wire communication paths.

Echo cancellation algorithms may be used to reduce or eliminate echo in the conference but require a high amount of computing resources. More efficient echo cancellation is achieved by a conference bridge that classifies individual endpoints or communication paths based on the amount of echo produced. The amount of echo is detected by an echo classifier module by measuring the power or voltage of the incoming and outgoing communication paths. Based on the classifier's determination of the severity of the echo, the classifier selects one of several echo control modes of operation to apply to each endpoint. The pass through mode of operation is used when the classifier deems that no additional echo control is needed. The suppression mode of operation is used when a relatively small amount of echo is detected from the endpoint. The full cancellation mode of operation is used when a relatively large amount of echo is detected.

In one aspect, a method includes receiving an input send signal from an endpoint, calculating an echo return loss based on the input send signal and an output receive signal, providing a plurality of modes of echo control, selecting a first mode of the plurality of modes when then the echo return loss is less than or equal to a threshold level and selecting a second mode of the plurality of modes when the echo return loss is greater than the threshold level, and performing echo control on the input send signal according to the first mode or the second mode selected based on the echo return loss.

In a second aspect, an apparatus includes an interface, a memory and a processor. The interface receives an input send signal from an endpoint. The memory stores a threshold level. The processor is configured to calculate an echo return loss based on a ratio of the input send signal and a output receive signal and perform full echo cancellation on the input send signal when the echo return loss is less than the threshold level and not perform full echo cancellation on the input send signal when the echo return loss is greater than the threshold level.

In a third aspect, logic is operable to receive an input send signal from an endpoint, receive an output receive signal from a conference bridge controller, calculate an echo characteristic based on the input send signal and the output receive signal, and select a plurality of echo cancellation modes for the input send signal based on different values of the echo characteristic.

Example Embodiments

FIG. 1 illustrates an embodiment of an audio conference. The conference bridge 10 administers the conference. The conference bridge 10 may be implemented using software or hardware. The conference bridge 10 communicates with endpoints 18a-n using ports. There may be any number of endpoints and ports from 2 to N. In some conferences, there may be as many as hundreds of endpoints. In FIG. 1, the send direction is from right to left, and the receive direction is from left to right. The endpoints 18a-n may include IP phone endpoints and/or plain old telephone system (POTS) endpoints. The example illustrated by FIG. 1 includes a combination of IP phone endpoints, corresponding to Callers A-C, and at least one POTS endpoint, corresponding to caller N. The communication paths 16 include audio packet streams or other media streams. The IP phone endpoints may utilize voice over internet protocol (VoIP).

The communication paths 16 may be in communication with a packet network 17, such as the internet. In addition, the communication paths 16 may include a local area network (LAN), a wide area network (WAN), a wired network, a wireless network, a cellular network, a combination thereof, or any other network suitable for carrying media. The packet network 17 may include one or more intermediary components, such as gateways, routers, switches, hubs, or other components.

The POTS endpoint 18n is part of a public switched telecom (telephone) network (PSTN) 19, which connects to the packet network 17 by way of a voice gateway (VGW) 20. In limited circumstances, the voice gateway 20 may be capable of echo cancellation. However, even in those scenarios, some echo situations cannot be handled by the voice gateway. For example, signals from the conference bridge 10 to POTS endpoint 18n may experience significant delays in some overseas calls to cause public switched telecom network 19 echo signal delay to exceed the echo cancellation capability of the voice gateway 20.

The conference bridge 10 includes a conference bridge controller 15, echo control devices (ECD) 14a-n, speech encoders 11a-n, speech decoders 12a-n, and jitter buffers 13a-n. The conference bridge controller 15 mixes conferences. That is, the conference bridge controller 15 combines the media stream from each of the endpoints 18a-n for transmission to the other endpoints in a given conference.

The main function of the jitter buffers 13a-n is to remove the variations in packet arrival times from packet network 17 such that packets are delivered to the speech decoders 12a-n at a constant rate. In performing this function, the jitter buffers 13a-n add delays to the packets received from the packet network 17 and delivered to decoders 12a-n. The jitter buffers 13a-n may also re-sequence incoming packets so they are delivered in order to the decoders 12a-n. Alternatively, conference bridge 10 may not include the jitter buffers 13a-n, which reduces speech packet latencies between the endpoints 18a-n and decoders 12a-n, but this may result in speech interruptions due to excessive packet network 10 jitter. The jitter buffers 13a-n may be implemented in software or hardware.

The speech decoders 12a-n decompress the media stream data received from the endpoints 18a-n into a format usable by the echo control devices 14a-n and the conference bridge controller 15. The encoders 11a-n compress the output data of the echo control devices 14a-n into a format that can be transmitted across the packet network 17.

Each of the echo control devices 14a-n is associated with a corresponding endpoint 19a-n. The echo control device eliminates or significantly reduces the echo in each call leg. In one example, including only Callers A and B, when Caller A speaks and Caller B is silent, any echo of Caller A heard by Caller A results from the echo tail of Caller B at the endpoint 18b of Caller B. The echo caused by Caller B is controlled by echo control device 14b. In a general example, if there are N endpoints, any echo heard by Caller A could have originated with any combination of the echo tails from any of the other N−1 endpoints. In other words, the echo heard by Caller A is controlled by echo control devices 14b-n, and the echo heard by Caller B is controlled by echo control device 14a as well as echo control devices 14c-n. In alternative embodiments, one or more of the echo control devices 14 may be associated with multiple Callers, such as echo control devices 14a and b being combined into one device associated with Callers A and B.

Figure 2:
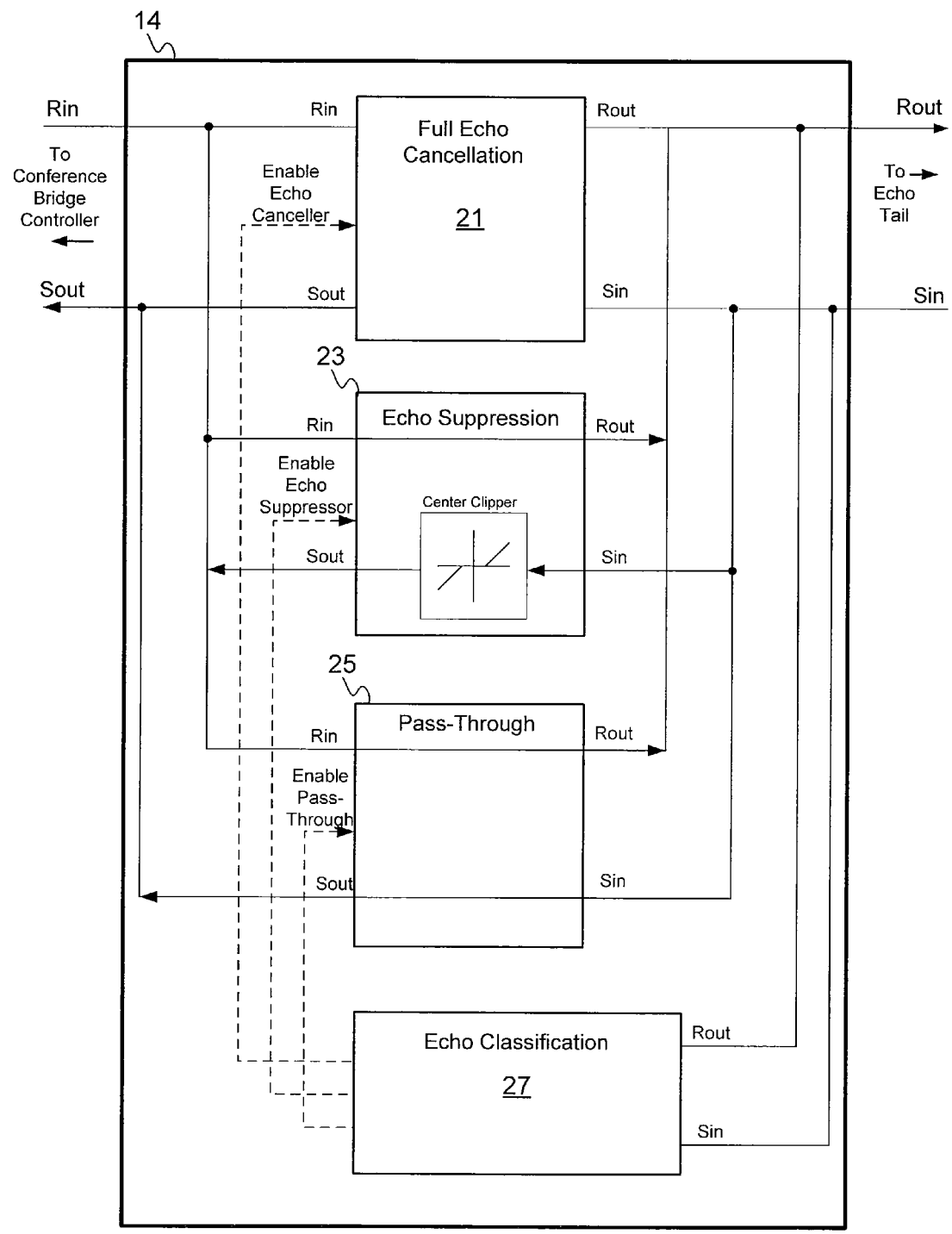
FIG. 2 illustrates an example echo control device.

FIG. 2 illustrates an example echo control device 14. The echo control device 14 includes echo classifier 27, a full echo canceller 21, an echo suppressor 23, and a pass through 25. In one alternative the echo control device 14 includes additional, different, or fewer components, such as including any two of the full echo canceller 21, the echo suppressor 23, and a pass through 25, which are implemented in hardware and/or software, such as being in separate devices or being software in one device. In another alternative the echo control device 14 consolidates the full echo canceller 21, the echo suppressor 23, and a pass through 25 into one hardware and/or software component. The full echo canceller 21, the echo suppressor 23, and the pass through 25 provide a plurality of levels of echo cancellation. The echo cancellation level of the pass through 25 may be considered zero or an absence of echo cancellation.

The echo control device 14 has two inputs, a receive input (Rin) and a send input (Sin), and two outputs, a receive output (Rout) and a send output (Sout). The receive output is received by the corresponding endpoint and the send input is sent from the corresponding endpoint. Each echo control device 14a-n controls echo returning from Caller A-N. Any echo that is reflected back from Caller A enters the echo control device 14a in the Sin signal and any residual echo exits in the Sout signal.

The echo classifier 27 compares the Sin signal and the Rout signal to determine an echo return loss value or echo characteristic. The echo return loss value is compared to at least one threshold level. Based on the comparison, which is discussed in more detail below, the echo classifier 27 generates an enable pass through signal, an enable echo suppression signal, or an enable echo canceller signal. In this example embodiment only one control enable signal is active at a time resulting in the application of only one mode of echo control at a time.

The enable pass through signal activates the pass through 25. The pass through 25 passes the send and receive signals. That is, when the pass through 25 is activated, the Rin signal equals the Rout signal and the Sin equals the Sout signal. The pass through 25 is used when the classifier deems that no echo control is needed. Alternately, the enable pass through signal may activate a pass through mode in a controller or software. The pass through mode requires little to no processing or hardware resources.

The enable echo suppression signal activates the echo suppressor 23. Echo suppression is used when there exists in the send signal Sin a relatively small amount of echo from endpoints or residual echo from upstream echo control devices such as in voice gateway 20. The suppressor passively blocks the small amount of echo signal. The echo suppressor 23 includes a center clipper. The center clipper clips or removes all portions of the send signal below a predetermined level. When the echo suppressor 23 is activated, Sout includes the portions of the signal above a predetermined level. Alternately, the enable echo suppression signal may activate an echo suppression mode in a controller or software. The echo suppression mode requires more processing or hardware resources than the pass through mode but much less than full echo cancellation.

The enable echo cancellation signal activates the full echo canceller 21. The full echo canceller 21 removes echo from the Sin signal. The full echo canceller 21 is activated when the echo classifier 27 determines that a relatively large amount of echo is included in the Sin signal. Alternately, the enable echo cancellation signal may activate a full echo cancellation mode in a controller or software. The full echo cancellation mode actively and reliably eliminates or reduces the echo but requires more processing or hardware resources than the pass through mode or the echo suppression mode.

Each of the endpoints 18a-n is independently classified by echo classifiers in the respective echo cancellation devices 14a-n. Therefore, an echo control mode may be applied independently to each endpoint 18a-n of the conference. In addition, the echo control modes are controlled in real time. By applying only the level of echo control for each call leg as needed, the overall processing or hardware resources needed may be drastically reduced as compared to always-on cancellation to all endpoints.

When all endpoints 18a-n are silent, the Sout signal resulting from any of the three echo control modes may not include any audio. The increased clarity of modern communication lines may cause the listener to interpret silence as a malfunction. That is, the user may think the sound is so silent that there must be an error. To combat this effect, a small amount of background noise called comfort noise may be used. Comfort noise is artificial noise generated at a low but audible level. The level and frequency spectrum of comfort noise matches that of the background. The comfort noise may be generated to match specific endpoints. In other words, the conference bridge controller 15 or the echo control device 14*a-n* may insert comfort noise of differing levels and spectra selected based on the respective endpoint 18*a-n*. The comfort noise may be used in one or more of the full echo cancellation mode, the echo suppression mode, or the pass-through mode.

Figure 3:
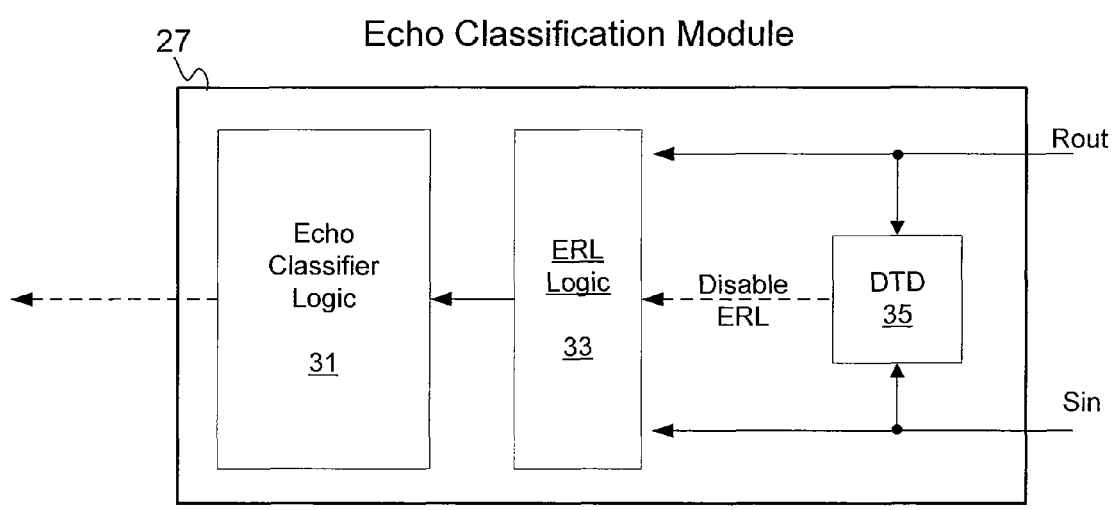
FIG. 3 illustrates a detailed view of the echo classifier of FIG. 2.

FIG. 3 illustrates a detailed view of the echo classifier 27. The echo classifier 27 includes echo classifier logic 31, echo return loss (ERL) logic 33, and a double talk detector (DTD) 35. The double talk detector 35 determines when both the endpoint 18 is talking on Sin and there is conference bridge 10 output audio in Rout (or otherwise both producing audio). When the double talk detector 35 determines that double talk is occurring, the calculation of the echo return loss is frozen or halted in the ERL logic 33 by way of the disable ERL signal.

Otherwise, the ERL logic 33 calculates the echo return loss. In one example, the echo return loss may be the ratio (comparison) between Rout signal level and the returned echo signal level in the Sin signal. The ERL logic 33 may include adders, subtractors, comparators, time delays, or other logic. The echo return loss is expressed in decibels (dB) and in most cases a positive value. A larger echo return loss value corresponds to a smaller echo signal. In a first implementation, the echo return loss (ERL) may be calculated using power [Eq1] or voltage [Eq2]:

$$ERL = 10 \log(\text{PowerRout}/\text{PowerSin}) \quad [\text{Eq1}]$$

$$ERL = 20 \log(\text{VoltageRout}/\text{VoltageSin}) \quad [\text{Eq2}].$$

The VoltageRout and VoltageSin values may be measured in root mean square values of volts. The PowerRout and PowerSin may be measured in any unit of power, such as watts. The PowerSin and VoltageSin are the levels of the returned echo signal without the double talk values including echo and speech.

The echo classifier logic 31 classifies the echo return loss and selects the appropriate mode control signal. The echo classifier logic 31 may include comparators or other logic. The echo return loss may be compared to one or more thresholds, which may be measured in dB. As the echo return loss increases, the amount of disruptive echo decreases. A first threshold (higher ERL threshold or bypass threshold) may be used to determine whether to activate the pass through 25 versus the echo suppressor 23. A second threshold (lower ERL threshold or suppression threshold) decides whether to activate the echo suppressor 23 versus the full echo canceller 21. Either or both of the first and second thresholds may be used. The first threshold is greater than the second threshold.

In a second implementation, the echo return loss is calculated using the ratio of the send signal to the receive signal where the second threshold is greater than the first threshold. In this scenario, the echo return loss (ERL) may be calculated using power [Eq3] or voltage [Eq4]:

$$ERL = -10 \log(\text{PowerSin}/\text{PowerRout}) \quad [\text{Eq3}]$$

$$ERL = -20 \log(\text{VoltageSin}/\text{VoltageRout}) \quad [\text{Eq4}].$$

Other ranges of echo suppression and corresponding thresholds may be used, such as providing only two or more than three levels.

Referring back to the first implementation, the values of the thresholds may be set to any values. Example ranges for the first threshold and the second threshold include 10 to 100 dB. Example values for the first threshold (bypass threshold) include 35 dB and 45 dB. Example values for the second threshold (suppression threshold) include 20 dB and 30 dB. The first and second threshold values may be variable and set or controlled by the user or by any endpoint 18*a-n*.

For example, consider a first threshold equal to 35 db and a second threshold equal to 20 db. When the echo return loss is greater than 35 dB, the pass through 25 is activated by the echo classifier 27. When the echo return loss is less than or equal to 35 dB but greater than 20 dB, the echo suppressor 23 is activated by the echo classifier 27. When echo return loss is less than or equal to 20 dB, the full echo canceller 21 is activated by the echo classifier 27.

In one implementation, the echo classifier logic 31 may use a hysteresis to avoid quick back and forth transitions between any two of the echo cancellation modes if ERL values from the ERL logic 33 slowly transition through a threshold. The echo classifier 27 may continuously monitor the echo return loss. The hysteresis may be implemented using a time delay or by using variable thresholds.

Using time delay, the echo classifier logic 31 does not permit a change from one echo cancellation mode to another within a predetermined time period. The predetermined time period may be any amount of time (e.g. 100 ms, 500 ms, or 1 second). Alternatively, ERL values from the ERL logic 33 may be averaged over a period of time to smooth frequent changes in ERL values and avoid abrupt changes in echo control mode.

Using hysteresis, the threshold for an echo return loss that is increasing is different than for an echo return loss that is decreasing. The hysteresis may adjust the threshold by a percentage or a fixed value. Example percentages may include 5%, 10%, or 20%. Example fixed values may include 1 dB, 2 dB, or 5 dB. For example, assume that the first threshold is nominally 35 dB, the second threshold is nominally 20 dB, and the hysteresis adjustment is 2 dB. When the echo return loss is less than 20 dB and increasing (the amount of echo is decreasing), the echo cancellation device 14 is in full echo cancellation mode. When the echo return loss exceeds 22 dB, the echo cancellation device 14 switches to the echo suppression mode. However, the second threshold is adjusted by 2 dB. If the echo return loss dips below 20 dB, the echo cancellation device 14 remains in the echo suppression mode until the echo return loss falls to 18 dB. In other words, the classification logic 31 adjusts the threshold level according to the direction or rate of change of the echo return loss.

A similar hysteresis band may be used around the first threshold to provide hysteresis when switching between the echo suppression mode and the pass through mode. Other examples of variable threshold to achieve hysteresis are apparent to one of ordinary skill in the art.

Figure 4:
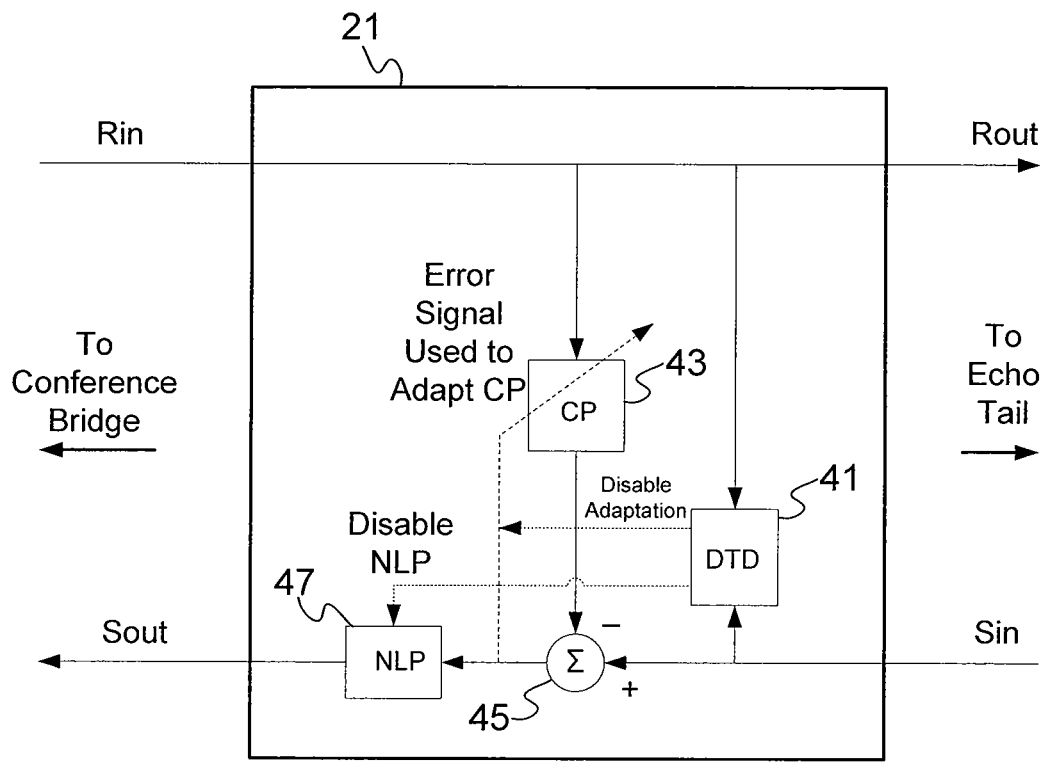
FIG. 4 illustrates a detailed view of the echo canceller of FIG. 2.

FIG. 4 illustrates a detailed view of the echo canceller 21. The echo canceller 21 includes a double talk detector 41, a convolution processor 43, a summation block 45, and a non-linear processor 47. Other implementations of the echo canceller are possible.

The convolution processor 43 uses the Rin signal entering the echo canceller 21 to create the mathematical estimation of the echo impulse as a function of time. The convolution processor 43 may include an adaptive filter. The estimation may be referred to as the H-register image. The Rin signal passes through the adaptive filter (or convolved by the H-register image) to generate the echo signal estimate. The estimation of the echo signal is used to eliminate the echo. In one example, this is achieved by the summation block 45, which subtracts the estimation from the Sin signal.

The signal at the output of the summation block 45 is the "error signal" because if the endpoint is not speaking and the echo path impulse response is linear and time invariant, this signal is zero for a perfect impulse response estimate. When the impulse response estimate is aligned in time with the echo signal resulting in a minimal error signal, the echo cancellation is converged. In other words, the H-register estimate is not changing. If the echo cancellation is not yet converged, or said to be diverged, the signal is representative of the error in approximating the echo path and is used to update the convolution processor 43 to reach a convergence estimate.

The double-talk detector 41 determines when the particular endpoint is silent. If the double-talk detector 41 concludes that the endpoint is silent, the H-register seeks to improve the estimate of the echo. In addition, the non-linear processor 47 is activated to attenuate any residual echo that might be returned back toward the conference bridge controller 15. The non-linear processor 47 suppresses the echo remaining in the error signal. In one embodiment, the comfort noise discussed above is inserted into the Sout signal by the non-linear processor 47. If the double-talk detector 41 concludes that the endpoint is speaking, the H-register is frozen and remains unchanged and the non-linear process 47 is deactivated.

The echo may be caused by a variety of sources. One source of echo is a discontinuity in the communication path. The discontinuity may be cause by mismatched impedances in the communication path. This is common when a four wire system, including separate receive and transmit channels, is connected with a two wire system, including a single bi-directional channel.

Another source of echo results an echo return point exists in the PSTN side of a connected voice gateway in a hybrid (IP and PSTN) system. Often echoes from these sources escapes control by the voice gateway network echo canceller when the PSTN echo delay exceeds the echo canceller's capability.

Other sources of echo are within the endpoints 18*a-n*. Acoustic echo may be caused when the microphone in an endpoint picks up the output of its own speaker without proper echo cancelling within the endpoint. Acoustic echo may also be caused by the surroundings of the endpoint. In addition, poor mounting or poor isolation can cause acoustic echo. The mechanical coupling or housing between the microphone and speaker can transmit vibrations from the speaker to the microphone. Further, some software based IP phones may cause acoustic echo because the echo cancellation software is not properly matched to the actual computer running the software based IP phone.

Referring to FIG. 1, the endpoints 18*a-n* may be implemented using any combination of device suitable for audio and/or video conferencing. For example, one or more of the endpoints 18*a-n* may be a personal computer, an internet protocol (IP) phone, a video phone, a mobile phone, a tablet device, a personal digital assistant, a mobile computing device (MCD), or other devices including equipment suitable for establishing an supporting an audio or video conference.

Equipment suitable for establishing a video conference may include a display, a speaker, a camera, and a microphone. The display may be a cathode ray tube (CRT) monitor, a liquid crystal display (LCD) panel, or another type of display. The endpoints 18*a-n* may also include one or more network interfaces, memories, processors, codecs, and other hardware and software suitable for establishing and supporting video conferences. The endpoints 18*a-n* are capable of producing a media stream, including video and/or audio, that originates with the camera and/or microphone and is compressed and encoded by the processors or codecs and transmitted to communication path 16 using network interfaces.

Figure 5:
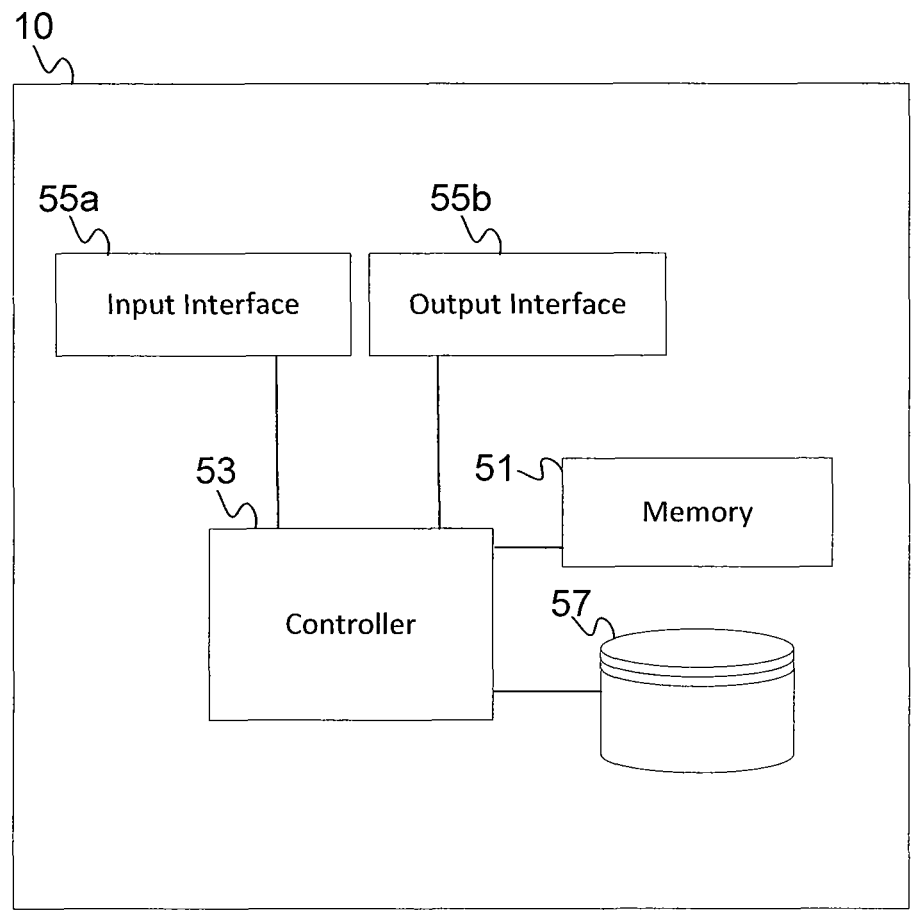
FIG. 5 illustrates a hardware implementation of a conference bridge including the echo control device according to one embodiment.

FIG. 5 illustrates a hardware implementation of the conference bridge 10 including the echo control device 14. The echo control devices 14*a-n* as well as the remaining components of the conference bridge 10 may be implemented as hardware or software. The conference bridge 10 includes a memory 51, a controller 53, and an input/output (I/O) interface 55. Optionally, conference bridge 10 may include an input device.

The memory 51 may be a volatile memory or a non-volatile memory. The memory 51 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 51 may include an optical, magnetic (hard drive) or any other form of data storage device. The memory 51 may be located in a remote device or removable, such as a secure digital (SD) memory card.

The memory 51 may store computer executable instructions. The controller 53 may execute computer executable instructions. The computer executable instructions may be included in computer code. The computer code may be stored in the memory 51. The computer code may be written in any computer language, such as C++, C#, Java, Pascal, Visual Basic, Perl, HyperText Markup Language (HTML), JavaScript, assembly language, extensible markup language (XML) and any combination thereof.

The computer code may be instructions encoded in one or more tangible computer readable media or one or more non-transitory computer readable media for execution by the controller 53 or a computer. The computer readable medium may include, but are not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 53 may comprise a general processor, digital signal processor, application specific integrated circuit, field programmable gate array, analog circuit, digital circuit, combinations thereof, or other now known or later developed processor. The controller 53 may be a single device or combinations of devices, such as associated with a network or distributed processing. Any of various processing strategies may be used, such as multi-processing, multi-tasking, parallel processing, remote processing, centralized processing or the like. The controller 53 may be responsive to or operable to execute instructions stored as part of software, hardware, integrated circuits, firmware, micro-code or the like. The functions, acts, methods or tasks illustrated in the figures or described herein may be performed by the controller 53 executing instructions stored in the memory 51. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 55 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the I/O interface 55 may comprise a first communication interface 55b devoted to sending data, packets, or datagrams and a second communication interface 55a devoted to receiving data, packets, or datagrams. Alternatively, the I/O interface 55 may be implemented using a single communication interface.

The input device allows a user or administrator to input commands to the conference bridge 10. The input device may be a keyboard, trackball, touch pad, a mouse, or other user input. Alternatively, the input device may be provided remotely at another terminal by way of a network or the Internet.

Figure 6:
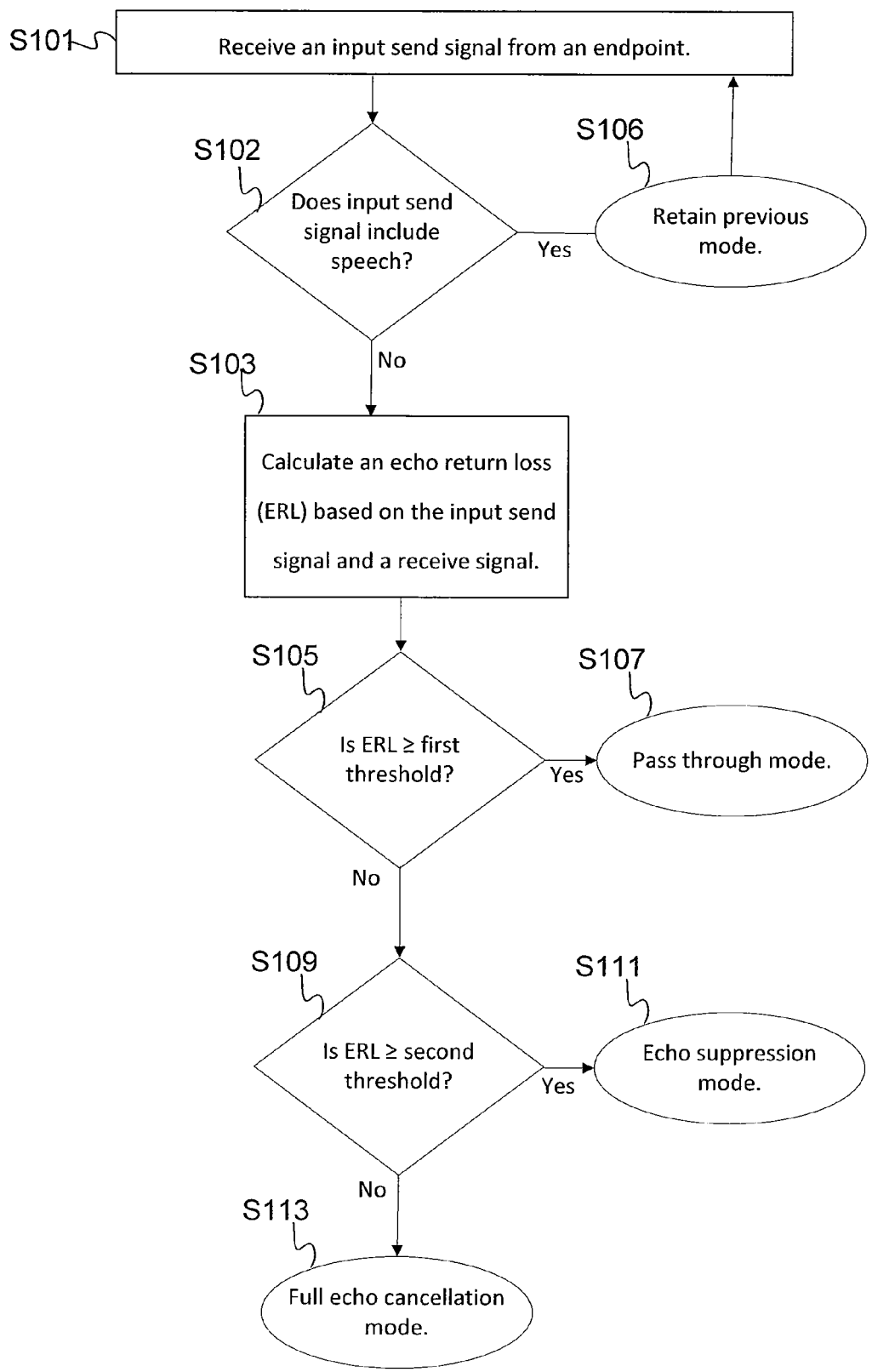
FIG. 6 illustrates an embodiment of a flow chart for echo control optimization.

FIG. 6 illustrates a flow chart for echo control optimization. At S101, the conference bridge 10 receives an input send signal from an endpoint. The endpoint may be any of endpoints 18a-n. The input send signal is part of a media stream that may include audio or video and audio that originates with the endpoint. The input send signal is delivered to an echo canceller device 14a-n specific to the endpoint 18a-n.

At S102, the double-talk detector 35 in the echo cancellation device 14 specific to the endpoint determines whether or not the input send signal contains speech from the endpoint. If speech exists in the input send signal, nothing is done. No new echo return loss (ERL) value based on the input send signal and a receive signal levels is calculated. The previous echo control mode is retained, as shown at S106. If speech does not exist in the input send signal, then the process flow continues to S103. In other words, if only echo exists in the input send signal, then the flow continues to S103.

At S103, the echo cancellation device 14 specific to the endpoint calculates an echo return loss (ERL) based on the input send signal and a receive signal levels. The receive signal is transmitted to the other endpoints. The conference bridge controller 15 generates the receive signal by mixing or combining the send signals from the other endpoints in the conference.

At S105 and S109, the echo controller logic 31 compares the ERL to a first threshold and a second threshold. The first threshold value is greater than the second threshold value. In one embodiment, only one threshold is used. If the ERL is above the first threshold, the pass through mode is activated at S107. If the ERL is below or equal to the first threshold but above the second threshold, the echo suppression mode is activated at S111. If the ERL is below the second threshold, the full echo cancellation mode is activated at S113. In other words, the echo control device 14 performs echo cancellation on the input send signal when then the echo return loss is less than or equal to a threshold level.

In one embodiment, the conference bridge 10 may be configured to receive an input using the input device to select a first configuration including a single threshold and a second configuration including both the first threshold and the second threshold. The first configuration may use any combination of the three possible echo control modes. For example, in one implementation of the first configuration, the echo control device 14 selects the pass through mode when the ERL is above the single threshold and the echo suppression mode when the ERL is below the single threshold. In another implementation of the first configuration, the echo control device 14 selects the pass through mode when the ERL is above the threshold and the full echo cancellation mode when the ERL is below the threshold. In another implementation of the first configuration, the echo control device 14 selects the echo suppression mode when the ERL is above the threshold and the full echo cancellation mode when the ERL is below the threshold.

While the disclosed embodiments are discussed in terms of audio only, the conference may include both audio and video. Accordingly, the endpoints 18a-n may be audio and video endpoints including a camera and a microphone, and the conference bridge 10 may be configured to process signals including both audio and video components or separate audio signals and video signals.

In some conferences, echo is infrequent or may be limited to relatively few participants. Processor or hardware resource efficiencies may be achieved by selective application of echo control devices 14, which may be implemented as software. It is possible to take advantage of the tendency that the majority of conference endpoints have little or no echo. Echo at endpoints with little or no echo can be eliminated or reduced with simple echo control techniques using minimal processing or hardware resources. Aggressive echo control is applied to the fraction of conference endpoints that suffer from disruptive echo. Using those resources for only the fraction of conference endpoints results in considerably less processing or hardware resources as compared to a conference where full echo cancellation is performed for each endpoint.

In the following hypothetical, gains from the efficiencies are illustrated. In one scenario, the full echo cancellation mode may require twenty times the resources of a pass through mode. Consider the conference bridge that can support 50 endpoints using full echo cancellation. If only 5% of endpoints require full echo cancellation and the remainder use pass through mode, the same conference bridge can support 525 endpoints. The example distribution includes 25 endpoints using full echo cancellation and 500 endpoints using pass through modes. Similar illustrations are possible using all three echo cancellation modes.

Various embodiments described herein can be used alone or in combination with one another. The foregoing detailed description has described only a few of the many possible implementations of the present invention. For this reason, this detailed description is intended by way of illustration, and not by way of limitation.

Example embodiments include a method including receiving an input send signal from an endpoint; calculating an echo return loss based on the input send signal and an output receive signal. The method also includes providing a plurality of modes of echo control. The method also includes selecting a first mode of the plurality of modes when then the echo return loss is less than or equal to a threshold level and selecting a second mode of the plurality of modes when the echo return loss is greater than the threshold level. The method also includes performing echo control on the input send signal according to the first mode or the second mode selected based on the echo return loss. The method also includes transmitting a resultant send signal to a conference bridge controller, which mixes a plurality of signals including the resultant send signal.

The first mode may include suppressing echo by removing a portion of the input send signal and the second mode may include passing the input send signal. Also, the first mode may include cancelling echo by subtracting an estimation of an echo signal and the second mode may include passing the input send signal. Also, the first mode may include cancelling echo by subtracting an estimation of an echo signal and the second mode may include suppressing echo by removing a portion of the input send signal.

The threshold level may include a first threshold level and the method may further include: selecting a third mode of the plurality of modes when then the echo return loss is greater than a second threshold level; and performing echo control on the input send signal according to the first mode, the second mode, or the third mode based on the echo return loss, wherein the first mode may include cancelling echo by subtracting an estimation of an echo signal, the second mode may include suppressing echo by removing a portion of the input send signal, and the third mode may include passing the input send signal. The portion of the input send signal may be replaced with artificial noise generated based on at least one of a power level and a spectrum of a background noise produced by the endpoint Also, the endpoint may be a first endpoint and the method may further include: transmitting the output signal to a second endpoint by way of an Internet protocol (IP) network, wherein the input send signal is sent from the first endpoint by way of a public switched telephone network (PSTN), and wherein the echo is caused, at least in part, by a discontinuity between the IP network and the PSTN.

The echo return loss may include an acoustic echo caused by surroundings of the endpoint or by physical characteristics of the endpoint. The echo return loss may be a first echo return loss and the method may further include: delaying a second calculation of a second echo return loss for a predetermined time period. The echo return loss may be a first echo return loss and the method may further include: calculating a second echo return loss subsequent to the first echo return loss; and adjusting the threshold level based on whether a change between the first echo return loss and the second echo return loss is increasing or decreasing.

Furthermore, example embodiments include an apparatus including an interface to receive an input send signal from an endpoint. The apparatus also includes a memory to store a threshold level and a processor configured to calculate an echo return loss based on a ratio of the input send signal and a output receive signal and perform full echo cancellation on the input send signal when the echo return loss is less than the threshold level and not perform full echo cancellation on the input send signal when the echo return loss is greater than the threshold level.

The threshold level may be a first threshold level and the apparatus may further include: performing echo suppression on the input send signal when the echo return loss is greater than the first threshold level but less than a second threshold level; and passing the input send signal when the echo return loss is greater than the second threshold level. The endpoint may be a first endpoint and the interface may be further configured to transmit the output receive signal to a second endpoint by way of an internet protocol (IP) network, wherein the input send signal is transmitted from the first endpoint by way of a public switched telephone network (PSTN), and wherein an echo is caused, at least in part, by a discontinuity between the IP network and the PSTN.

An acoustic echo caused by surroundings of the endpoint or a mechanical echo caused by physical characteristics of the endpoint contributes to the echo return loss.

The threshold level may be adjusted according to whether the echo return loss is increasing or decreasing.

The processor may be configured to delay calculating the echo return loss for a predetermined time period.

Furthermore, example embodiments include a non-transitory computer readable storage medium encoded with instructions capable of being executed by a computer to receive an input send signal from an endpoint; receive an output receive signal from a conference bridge controller; calculate an echo characteristic based on the input send signal and the output receive signal; and select a plurality of echo control modes for the input send signal based on different values of the echo characteristic. The plurality of echo control modes may include: a full cancellation mode that subtracts an estimation of an echo signal from the input send signal; a suppression mode that clips a portion of the input send signal; and a bypass mode that passes the input send signal. The endpoint may be a first endpoint, the logic may be further operable to: transmit the output signal to a second endpoint by way of an internet protocol (IP) network, wherein the input send signal is sent from the first endpoint by way of a public switched telephone network (PSTN), and wherein echo is caused, at least in part, by a discontinuity between the IP network and the PSTN.

We claim:

1. A method, comprising:
   receiving, at an echo control device, an input send signal from an endpoint;
   determining a first echo return loss based on an echo tail of the input send signal;
   delaying a second determination of a second echo return loss for a predetermined time period;
   determining the second echo return loss subsequent to the determination of the first echo return loss;
   determining a high threshold and a low threshold based on a difference between the first echo return loss and the second echo return loss;
   operating a conference bridge in a pass through mode, due to the second echo return loss being above the high threshold;
   operating the conference bridge in an echo cancellation mode, due to the second echo return loss being below the low threshold; and
   operating the conference bridge in an echo suppression mode, due to the second echo return loss being between the low threshold and the high threshold.

2. The method of claim 1, further comprising transmitting a resultant send signal to a conference bridge controller, wherein the conference bridge mixes a plurality of signals including the resultant send signal.

3. The method of claim 1, wherein the echo suppression mode includes suppressing echo by removing a portion of the input send signal.

4. The method of claim 3, wherein the echo suppression is performed by the echo control device.

5. The method of claim 3, further comprising generating artificial noise based on a power level produced by the endpoint, a spectrum of a background noise produced by the endpoint, or both, wherein suppressing echo comprises replacing the portion of the input send signal with the generated artificial noise.

6. The method of claim 1, wherein the echo cancellation mode includes cancelling echo by subtracting an estimation of an echo signal.

7. The method of claim 6, further comprising performing the cancelling of echo by the echo control device.

8. The method of claim 1, wherein the echo cancellation mode includes cancelling echo by subtracting an estimation of an echo signal, and wherein the echo suppression mode includes suppressing echo by removing a portion of the input send signal.

9. The method of claim 8, performing the cancelling echo and the echo suppression by the echo control device.

10. The method of claim 1, wherein the endpoint is a first endpoint, wherein the method further comprises transmitting an output signal to a second endpoint by way of an Internet protocol (IP) network, wherein the input send signal is sent from the first endpoint by way of a public switched telephone network (PSTN), and wherein echo is caused, at least in part, by a discontinuity between the IP network and the PSTN.

11. The method of claim 1, wherein the first and second echo return losses each include an acoustic echo caused by surroundings of the endpoint, physical characteristics of the endpoint, or both.

12. An echo control device, comprising:
classifier circuitry, configured to:
determine a first echo return loss based on an echo tail of an input send signal received from an endpoint;
determine a second echo return loss based on the echo tail of the input send signal, the determination of the second echo return loss occurring a pre-defined amount of time after the determination of the first echo return loss; and
determine a high threshold and a low threshold based on a difference between the first echo return loss and the second echo return loss;
pass-through circuitry, configured to maintain echo, in response to the second echo return loss being above the high threshold;
canceller circuitry, configure to cancel echo, in response to the second echo return loss being below the low threshold; and
suppressor circuitry, configured to suppress echo, in response to the second echo return loss being between the low threshold and the high threshold.

13. The device of claim 12, wherein the suppressor circuitry is further configured to suppress echo by removal of a portion of the input send signal.

14. The device of claim 13, wherein the suppressor circuitry is further configured to replace the portion of the input send signal with artificial noise generated according to a power level produced by the endpoint, a spectrum of a background noise produced by the endpoint, or both.

15. The device of claim 12, wherein the canceller circuitry is further configured to cancel echo by subtraction of an estimate of the echo tail.

16. The device of claim 13, wherein the suppressor circuitry is further configured to replace the portion of the input send signal with artificial noise generated according to a power level produced by the endpoint, a spectrum of a background noise produced by the endpoint, or both, and
wherein the canceller circuitry is further configured to cancel echo by subtraction of an estimate of the echo tail.

17. The device of claim 12, wherein the first and second echo return losses each include an acoustic echo caused by surroundings of the endpoint, physical characteristics of the endpoint, or both.

18. A system, comprising:
a communications interface, configured to receive an input send signal from an endpoint;
classifier circuitry, configured to:
determine a first echo return loss based on the input send signal;
determine a second echo return loss based on the input send signal, the determination of the second echo return loss occurring a pre-defined amount of time after the determination of the first echo return loss; and
determine a high threshold and a low threshold based on a difference between the first echo return loss and the second echo return loss; and
echo control circuitry, configured to:
ignore echo, due to the second echo return loss being above the high threshold;
cancel echo, due to the second echo return loss being below the low threshold; and
suppress echo, due to the second echo return loss being between the low threshold and the high threshold.

19. The system of claim 18, wherein the echo control circuitry is further configured to suppress echo by removing a portion of the input send signal.

20. The system of claim 19, wherein the echo control circuitry is further configured to:
replace the portion of the input send signal with artificial noise generated according to a power level produced by the endpoint, a spectrum of a background noise produced by the endpoint, or both; and
cancel echo by subtracting an estimation of an echo signal.

* * * * *